(12) United States Patent
Lamminger et al.

(10) Patent No.: US 9,869,344 B2
(45) Date of Patent: Jan. 16, 2018

(54) OPERATING DEVICE, IN PARTICULAR FOR A VEHICLE COMPONENT, AND METHOD FOR THE PRODUCTION THEREOF

(71) Applicant: Behr-Hella Thermocontrol GmbH, Stuttgart (DE)

(72) Inventors: Egbert Lamminger, Soest (DE); Udo Treuguth, Erwitte (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 117 days.

(21) Appl. No.: 14/442,916

(22) PCT Filed: Nov. 13, 2013

(86) PCT No.: PCT/EP2013/073692

§ 371 (c)(1),
(2) Date: May 14, 2015

(87) PCT Pub. No.: WO2014/076115

PCT Pub. Date: May 22, 2014

(65) Prior Publication Data

US 2015/0330441 A1    Nov. 19, 2015

(30) Foreign Application Priority Data

Nov. 15, 2012 (DE) .................. 10 2012 220 917

(51) Int. Cl.
*F16C 43/02* (2006.01)
*B60K 37/06* (2006.01)
(Continued)

(52) U.S. Cl.
CPC ............ *F16C 17/02* (2013.01); *B29C 45/006* (2013.01); *B29C 45/0017* (2013.01);
(Continued)

(58) Field of Classification Search
CPC .......... F16C 17/02; F16C 43/02; B60K 37/06; B29C 45/0003; B29C 45/0017;
(Continued)

(56) References Cited

U.S. PATENT DOCUMENTS 4,735,753 A * 4/1988 Ackermann ........... A41H 37/04
156/580.1
2008/0078054 A1    4/2008 Huang

FOREIGN PATENT DOCUMENTS

DE        35 08 232 A1    9/1986
DE        295 16 875 U1    5/1996
(Continued)

OTHER PUBLICATIONS

Hachiman JP 2001184969 A1 Translation.*
(Continued)

*Primary Examiner* — Jason L Vaughan
*Assistant Examiner* — Amanda Meneghini
(74) *Attorney, Agent, or Firm* — Renner, Otto, Boisselle & Sklar, LLP

(57) ABSTRACT

The operating device, in particular for a vehicle component, is provided with a rotary operating element (18), which can be rotated about a rotation axis (20) and is formed as a plastic injection-molded part, which is produced in a molding die (48) having a die separation plane (46), and with a bearing unit (12), on which the rotary operating element (18) is mounted such that it can rotate about the rotation axis (20). The bearing unit (12) has a first bearing element (14), which is formed as a plastic injection-molded part, which is produced in a molding die (28) having a die separation plane (34). The first bearing element (14) has a bearing surface (26), which extends in a radial plane to the rotation axis (20) and concentrically to same, and the rotary operating element (18) has a contact surface (36), which bears against the (Continued)

Figure 1:
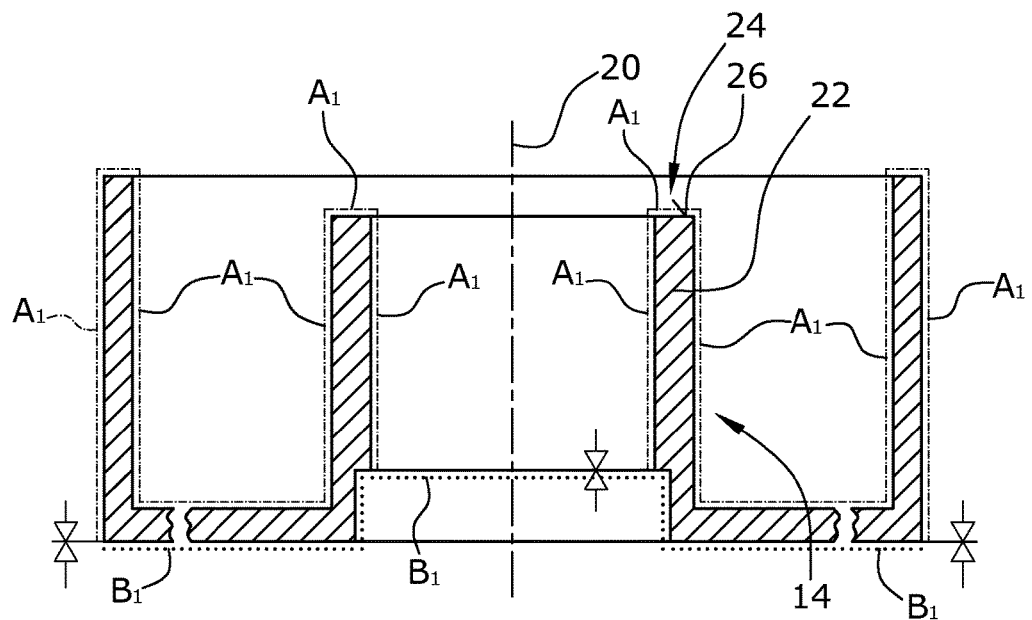

bearing surface (26) and likewise extends in a radial plane to the rotation axis (20) and concentrically to same. Either the bearing surface (26) of the first bearing element (14) or the contact surface (36) of the rotary operating element (18) is arranged outside the die separation plane (34; 46) of the injection-molding die (28; 48) for said relevant element (14; 18), and the other of the two surfaces (26; 36) is arranged in the die separation plane (34; 46) of the injection-molding die (28; 48) of said relevant element (14; 18).

6 Claims, 5 Drawing Sheets

(51) Int. Cl.
*F16C 17/02* (2006.01)
*B29C 45/00* (2006.01)
*B29C 45/26* (2006.01)
B29L 31/04 (2006.01)
B29L 19/00 (2006.01)
H01H 3/10 (2006.01)

(52) U.S. Cl.
CPC ............ *B29C 45/261* (2013.01); *B60K 37/06* (2013.01); *F16C 43/02* (2013.01); *B29L 2019/00* (2013.01); *B29L 2031/045* (2013.01); *B60K 2350/102* (2013.01); *H01H 3/10* (2013.01)

(58) Field of Classification Search
CPC . B29C 45/0053; B29C 45/006; B29C 45/261; B29C 65/002; B29C 65/56; B29C 65/562; B29C 65/58; B29C 65/565; B29C 65/76
See application file for complete search history.

(56) References Cited

FOREIGN PATENT DOCUMENTS

| DE | 10 2007 038547 A1 | 2/2009 |
| DE | 10 2009 048330 A1 | 4/2011 |
| GB | 1 129 852 A | 10/1968 |
| JP | 2000 100269 A | 4/2000 |
| JP | 2001 184969 A | 7/2001 |
| JP | 2001184969 A1 * | 7/2001 |
| JP | 2008 282773 A | 11/2008 |
| WO | 2012/089506 A1 | 7/2012 |

OTHER PUBLICATIONS

International Search Report and Written Opinion for corresponding Patent Application No. PCT/EP2013/073692 dated Jan. 3, 2014.

* cited by examiner

OPERATING DEVICE, IN PARTICULAR FOR A VEHICLE COMPONENT, AND METHOD FOR THE PRODUCTION THEREOF

The invention relates to an operating device, in particular for a vehicle component, wherein the operating device is provided in particular for a radio, a CD and/or DVD player, a navigation apparatus, an infotainment apparatus, a heating or air condition control device, or for a man-machine interface. Further, the invention relates to a method for the production and the assembly of such an operating device.

Operating devices for manually adjusting/setting of operating parameters for electric apparatuses are known in a variety of designs. Mostly, such operating devices comprise a so-called rotary control which is a rotary operating element rotatably supported at a bearing unit.

The structural components of an operating device are produced, as far as possible, as injection-molded plastic parts, which is advantageous with a view to low manufacturing costs. For this purpose, injection molding dies are used whose manufacture and dimensions show tolerances. In the simplest case, injection molding dies comprise two die parts between which a die separation plane extends that defines one (of, possibly, a plurality of) mold separation(s) of the injection-molded part. In this context, reference is made to die-dependent mold separations and die-independent mold separations, meaning planes/surfaces at the injection-molded parts which or whose relative positions are defined exclusively by shapes in the mould side of a single die part, forming the mold cavity (die-dependent mold separation) or by a/the mold separation plane (die-independent mold separation). Besides being determined by the tolerances with which the cooperating die parts of the mold are manufactured, the position of a die-independent mold separation is also determined by the precision of the contact between the die parts. Thus, if the die parts do not always contact each other in a continuously tight manner during the injection molding process (which may be the case, due to the molding die being "inflated" to different degrees as the plastic material is injected), the injection-molded parts differ at the mold separations defined by the die separation planes. Even if the differences are only on the order of a hundredth of a millimeter, they may have noticeable effects on the quality of the rotary bearing of a rotary control.

Examples for operating devices with rotary operating elements rotatably supported at a bearing unit are known from GB-A-1 129 852 and DE-U-295 16 875.

It is an object of the present invention to provide an operating device, in particular for vehicle components, which comprises a rotary operating element whose bearing has properties that are mechanically enhanced and, in particular, reproducible with higher precision.

To achieve the above object, the invention provides a method for the production of an operating device, in particular for a vehicle component, wherein the operating device comprises a rotary operating element and a bearing unit at which the rotary operating element is supported for rotation about a rotation axis, wherein in this method the rotary operating element rotatable about the rotation axis is produced as an injection-molded plastic part in a first molding die having a die separation plane, and the bearing unit comprises a first bearing element with a bearing surface that extends in a radial plane relative to the rotation axis and concentrically to the same, wherein the first bearing element is produced as an injection molded plastic part in a second molding die having a die separation plane, wherein, due to being produced by means of the molding die, the rotary operating element is provided with a contact surface that also extends in a radial plane relative to the rotation axis and concentrically to the same, wherein, in the respective first/second molding die, either the bearing surface of the first bearing element or the contact surface of the rotary operating element is arranged outside the die separation plane of the injection molding die of the respective element, wherein the other of the two surfaces is arranged in the die separation plane of the injection molding die for the respective element, and wherein the rotary operating element and the bearing unit are assembled to each other such that the contact surface of the rotary operating element contacts the bearing surface of the first bearing element of the bearing unit.

In this method it may further advantageously be provided that the rotary operating element has a flange on which the contact surface is formed, that the bearing unit comprises a second bearing element adapted to be mechanically coupled with the first bearing element, which has a support surface for support at the bearing surface of the first bearing element and a hold-down surface to extend above the flange of the rotary operating element, wherein the support surface and the hold-down surface are each substantially concentric with respect to the rotation axis and, seen along the rotation axis, spaced apart from each other, and that the second bearing element is formed as an injection-molded plastic part produced in a third molding die with a die separation plane, wherein the die separation plane of this injection molding die is arranged outside the support surface and the hold-down surface.

Further, it may be advantageous if the first bearing element has an inner, upward projecting collar inserted into the rotary operating element and having a front face that forms the first bearing surface when the flange of the rotary operating element rests on the front face with its contact surface and is radially spaced from the front face, and when the second bearing element is locked with the first bearing element, wherein locking projections of one bearing element, which lockingly cooperate with the other bearing element, are secured against inadvertent disengagement.

Eventually, it may be suitable if the flange of the rotary operating element protrudes inward from radially outside, and if the second bearing element is inserted into the first bearing element and is offset radially inward with respect to the first bearing element, wherein a spacer element is inserted into the second bearing element to prevent an inadvertent disengagement of the locking projections.

To solve this object, the invention further provides an operating device, in particular for a vehicle component, comprising:

a rotary operating element which is rotatable about a rotation axis, the element being formed as an injection-molded plastic part produced in a molding die having a die separation plane, and a bearing unit at which the rotary operating element is supported for rotation about the rotation axis, wherein the bearing unit comprises a first bearing element formed as an injection-molded plastic part produced in a molding die having a die separation plane, wherein the first bearing element has a bearing surface extending in a radial plane with respect to the rotation axis and concentrically to the same, and wherein the rotary operating element has a contact surface contacting the bearing surface, the contact surface also extending in a radial plane with respect to the rotation axis and concentrically to the same, wherein either the bearing surface of the first bearing element or the contact surface of the rotary operating element is arranged outside the die separation plane of the injection molding die of the respective element, and wherein the other of the two surfaces is arranged in the die separation plane of the injection molding die for the respective element.

The present construction concept for the rotary bearing of a plastic rotary operating element, such as they are used in great numbers as rotary controls in operating devices for vehicle components, for example, accordingly provides to position the contact surfaces of the rotary operating element and the rotary bearing, which rub on each other, such that only the one surface of the two contact surfaces, which must inevitably be provided, lies within the die separation plane of the injection molding die for the relevant element (i.e. the injection molding die for the rotary operating element or the bearing element). Thus, only this single contact surface results from a die-independent mold separation, i.e. it is subject to somewhat larger manufacturing tolerances that the other (second) contact surface whose position and tolerances are determined exclusively by a die-dependent mold separation.

With the approach of the present invention, it is possible to realize a rotary control (rotary operating element) structure whose quality is less dependent on temperature variations and manufacturing tolerances. Further, the manufacture, the assembly and the construction of components is simplified.

The reduced dependence on tolerances results in a reduced effect of undesired properties regarding haptics and acoustics, which are caused by friction (friction frequencies).

The above-mentioned properties of the structure according to the present invention are obtained primarily by a reduction of the die-independent mold separations at the rotary operating element and the bearing unit or the bearing elements thereof, an increase in die-dependent mold separations, a reduction of interfering friction frequencies (stick/slip frequencies—also referred to in common language as scratching and scraping), a reduction in the axial play between the (rotary bearing) contact surfaces rubbing on each other, a simplification of the components (component construction) and a simplification of the mounting and assembling process.

Preferably, it is provided that the rotary operating element has a flange on which the contact surface is formed, that the bearing unit comprises a second bearing element adapted to be mechanically coupled with the first bearing element, which has a support surface for support at the bearing surface of the first bearing element and a hold-down surface to extend above the flange of the rotary operating element, wherein the support surface and the hold-down surface are each substantially concentric with respect to the rotation axis and, seen along the rotation axis, spaced apart from each other, and that the second bearing element is formed as an injection-molded plastic part produced in a molding die with a die separation plane, wherein the die separation plane of this injection molding die is arranged outside the support surface and the hold-down surface.

In a preferred embodiment of the invention, it may be provided that the first bearing element has an inner, upward projecting collar inserted into the rotary operating element and having a front face that forms the first bearing surface, that the flange of the rotary operating element rests on the front face with its contact surface and is radially spaced from the front face, and that the second bearing element is locked with the first bearing element, wherein locking projections of one bearing element, which lockingly cooperate with the other bearing element, are secured against inadvertent disengagement.

In a further suitable embodiment of the invention, it is possible that the flange of the rotary operating element protrudes inward from radially outside, and that the second bearing element is inserted into the first bearing element and is offset radially inward with respect to the first bearing element, wherein a spacer element is inserted into the second bearing element to prevent an inadvertent disengagement of the locking projections.

Figure 2:
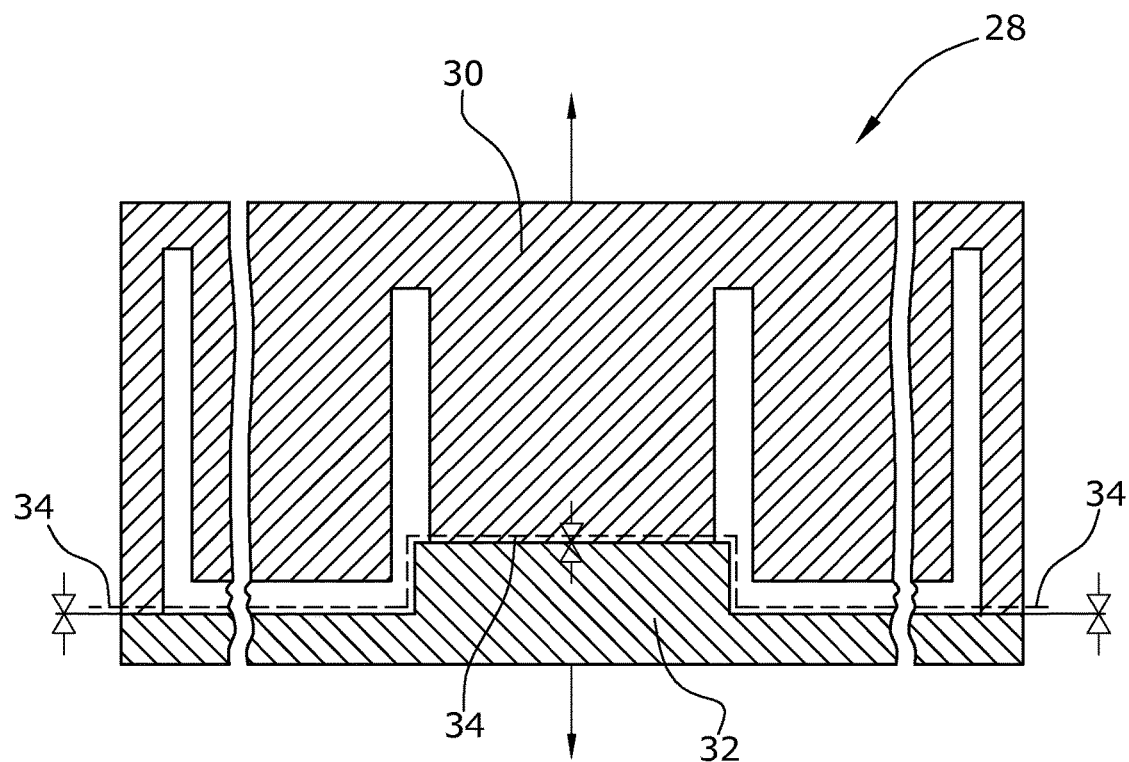
Figure 3:
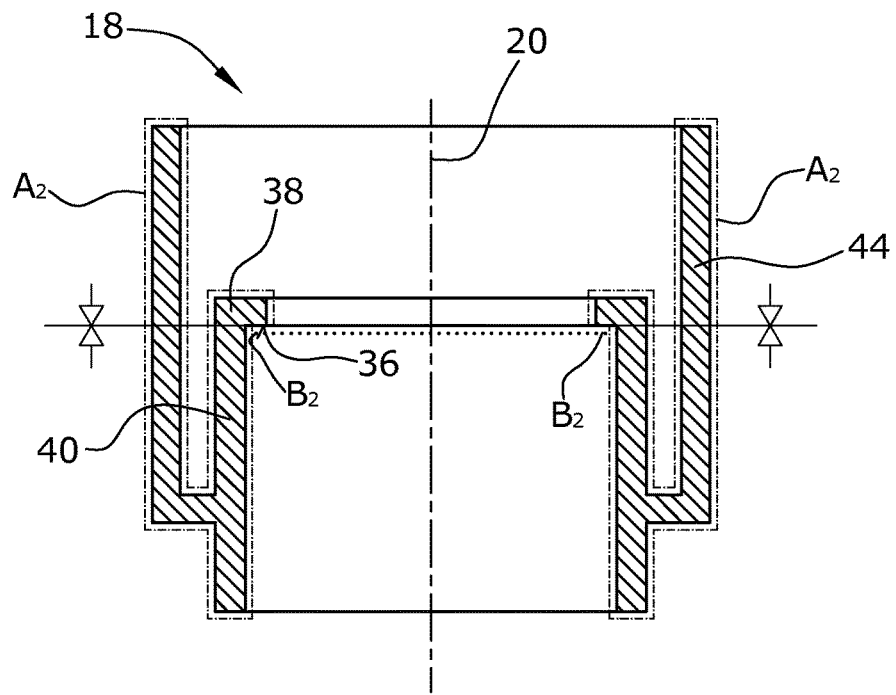
Figure 4:
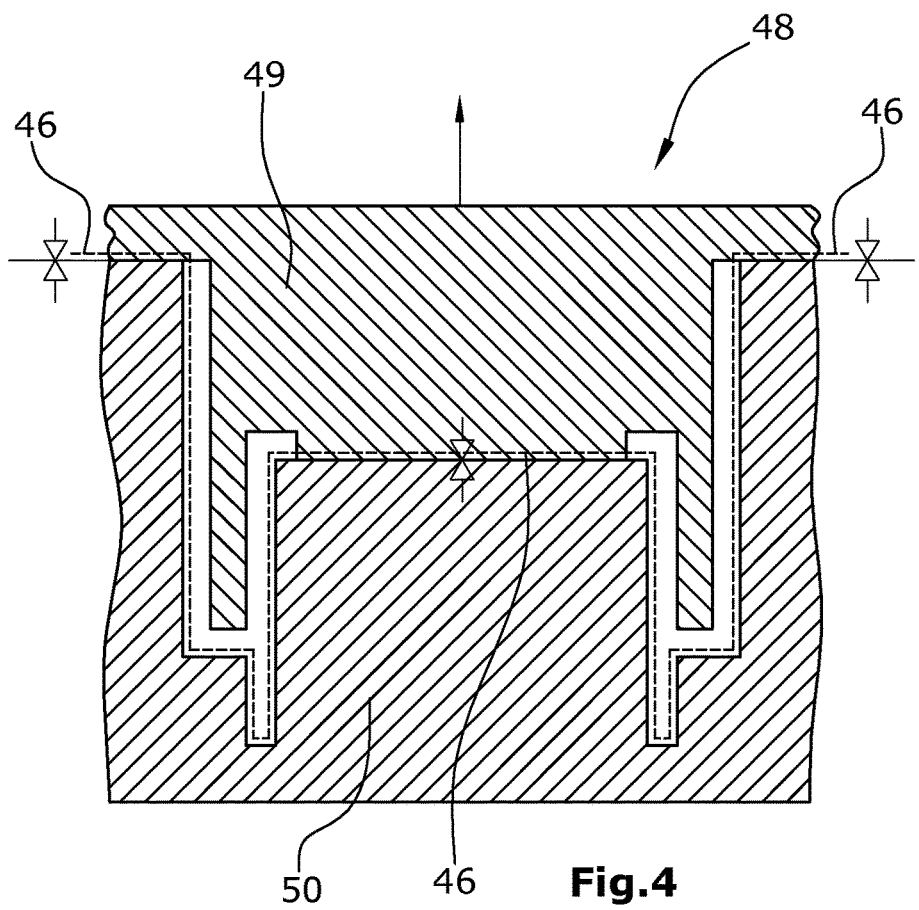
Figure 5:
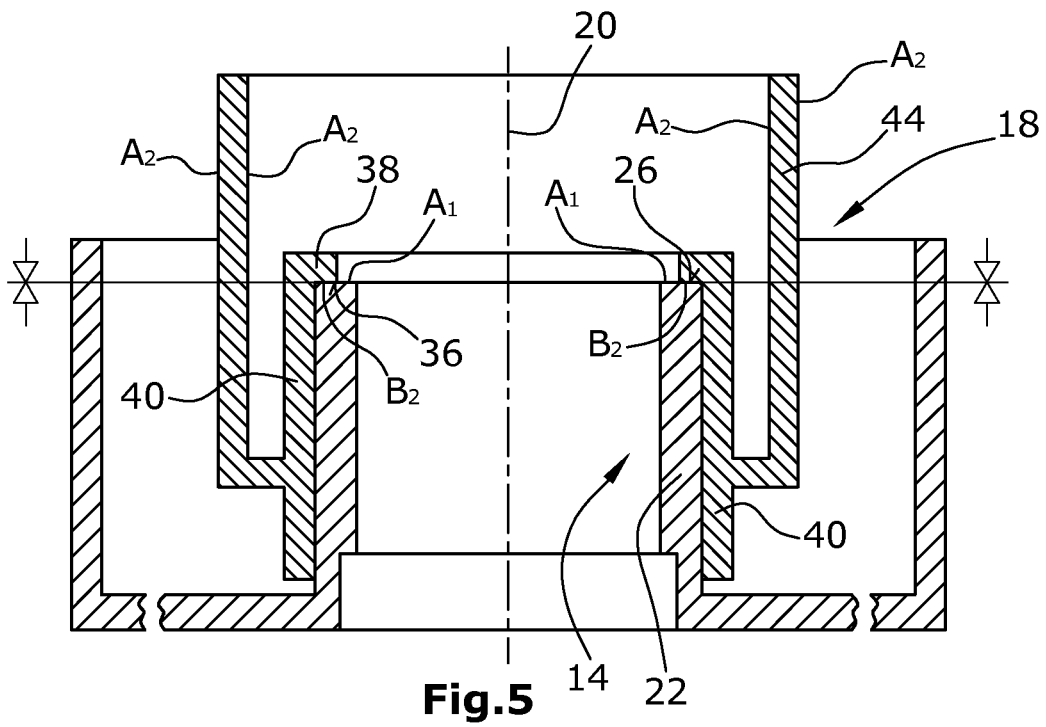
Figure 6:
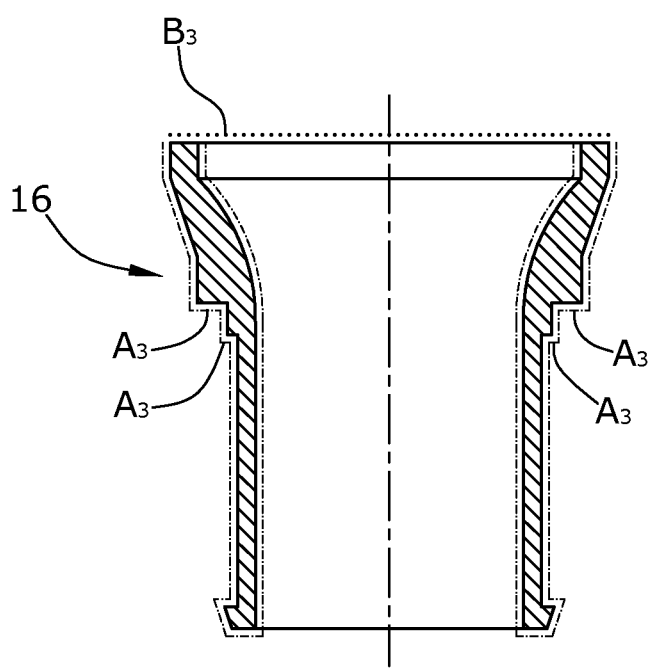
Figure 7:
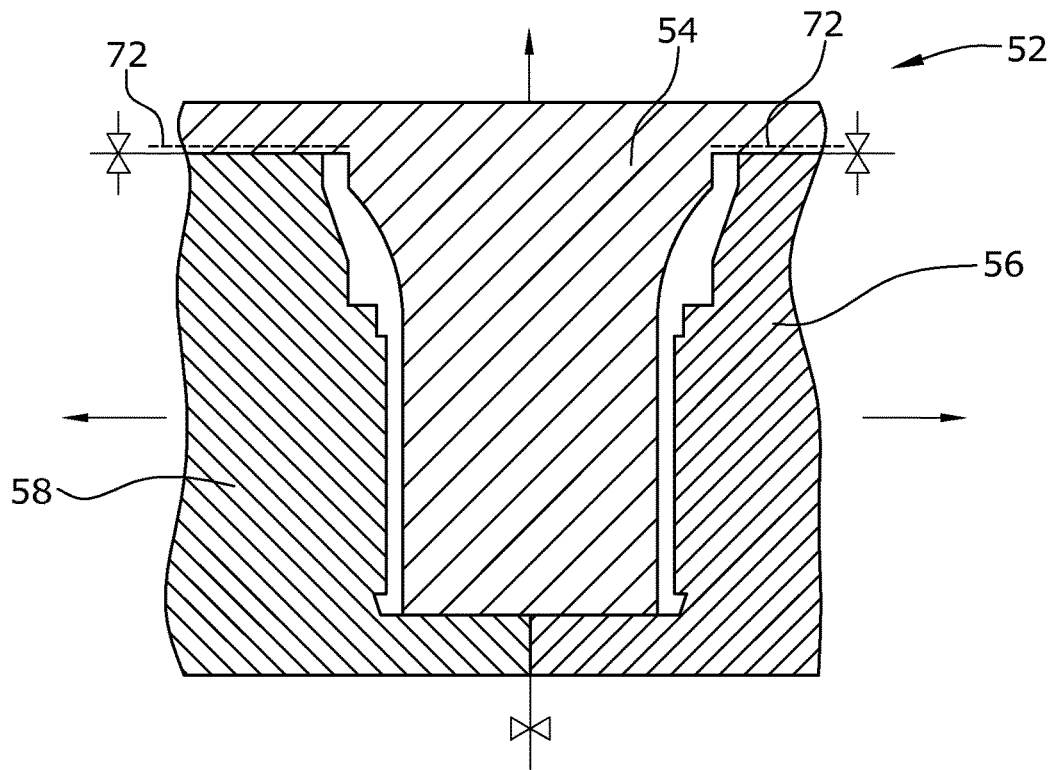
Figure 8:
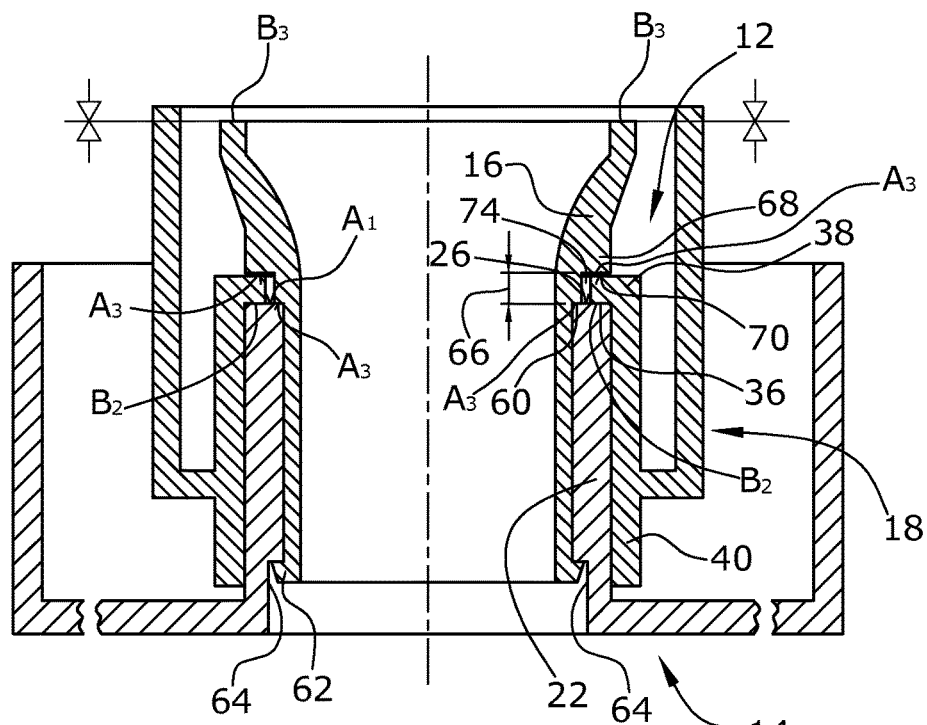
Figure 9:
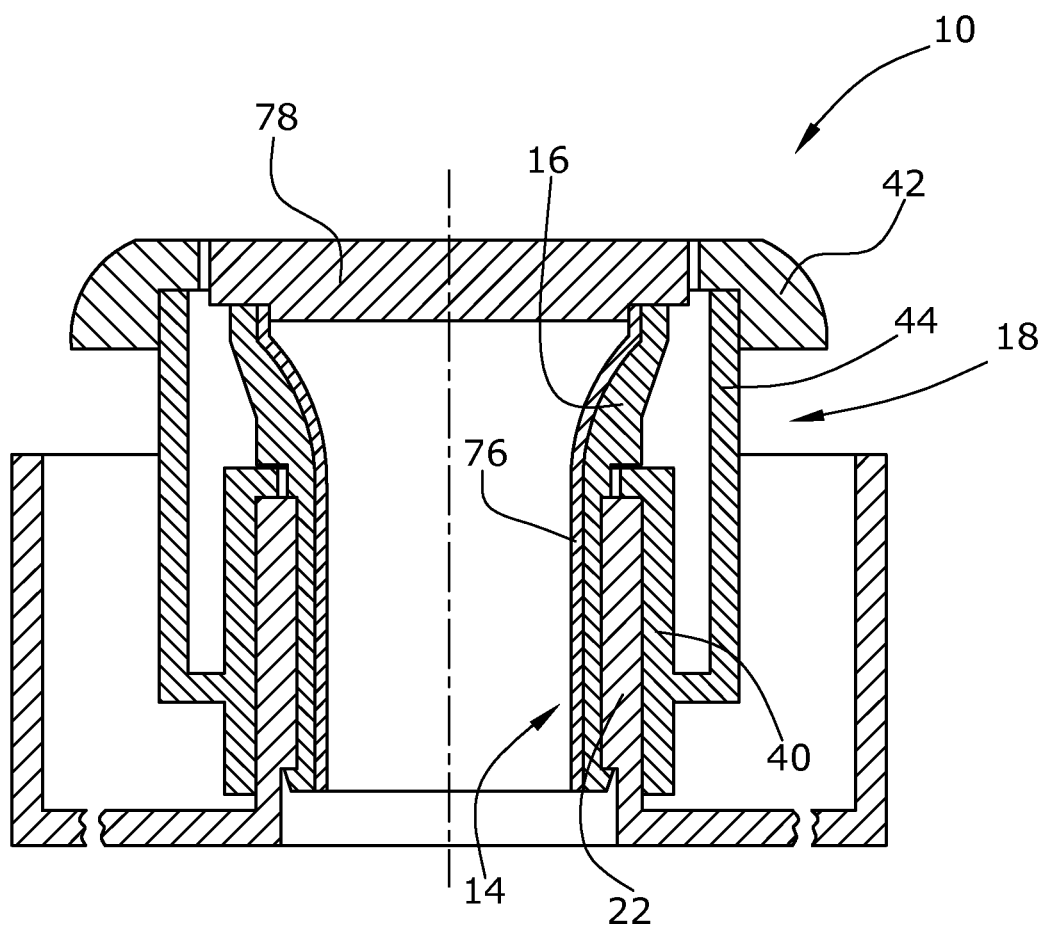

The invention will be explained in more detail hereunder with reference to an embodiment and to the schematic and basic illustration in the drawings. The Figures specifically show:

FIG. 1 the first bearing element of the bearing unit, shown in sectional view,

FIG. 2 the structure of a two-part molding die for the production of the first bearing element by injection molding, again shown in sectional view, FIG. 3 the operating element (or a part thereof), shown in sectional view, FIG. 4 the structure of a two-part molding die for the production of the rotary operating element by injection molding, again shown in sectional view, FIG. 5 a section through the assembled rotary operating element with the first bearing element, FIG. 6 the second bearing element of the bearing unit, shown in sectional view, FIG. 7 the structure of a two-part molding die for the production of the second bearing element by injection molding, again shown in sectional view, FIG. 8 a section through the assembled first and second bearing element and the rotary operating element, and FIG. 9 the structure of a rotary control design with further elements, again shown in sectional view.

On the one hand, FIGS. 1 to 8 illustrate the components of a rotary control structure of an operating device for a vehicle component (e.g. a rotary control for setting or adjusting the temperature in a vehicle air condition system), which are primarily relevant to the invention, and on the other hand, they illustrate the molding dies with which the components can be manufactured by injection molding.

The rotary control structure 10 (see FIGS. 8 and 9) comprises a bearing unit 12 having two bearing elements 14, 16 at which a rotary operating element 18 is supported for rotation (see, for example, FIGS. 5 and 8). The first bearing element 14 defines a rotation axis 20 by a (inner) collar 22 whose annular end face 24 forms a bearing surface 26 for the rotary operating element 28. A first particularity of the invention should be seen in the fact that the positional accuracy and the design of the bearing surface 26 is defined exclusively by a die-dependent mold separation (see $A_1$ in FIG. 1). This is due to the fact that the two-part molding die 28 used to produce the first bearing element 14, and its die parts 30 and 32, has a die separation plane 34 that extends outside the bearing surface 26 and thus not along the same. The die-independent mold separation caused by this die separation plane 34 is illustrated in FIG. 1 at $B_1$. In the other Figures, A and B (with different indices, respectively) also designate those surface regions of the injection-molded components that are defined by die-dependent or die-independent mold separations.

In other words, the bearing surface 26 can be produced with utmost precision.

A contact surface 36 of the rotary operating element 18 cooperates with the bearing surface 26 (see FIG. 3). In this embodiment, this contact surface 36 is formed on an inner flange 38 which protrudes from a sleeve 40 that is pushed axially over the collar 22. As can be seen in FIG. 9, for example, a rotating ring 42 is plugged on the rotary operating element 18, which rotating ring is manually rotatable and is retained on a retaining element 44 of the rotary operating element 18, wherein the retaining element 44 is connected to the sleeve 40 of the rotary operating element 18 for rotation therewith (and integrally with the same).

The contact surface 36 of the rotary operating element 18 results from a die-independent mold separation $B_2$ (see FIG. 3), since it extends within the die separation plane 46 of the injection molding die 48 of FIG. 4 with which the rotary operating element 18 is produced. Thus, the positional accuracy of the contact surface 36 also depends on the degree of moving or pressing the two die parts 49 and 50 of the injection molding die 48 together. The assembly of the two bearing elements 14, 16 to the rotary operating element 18 is illustrated in FIGS. 5 and 8. The injection molding die 52, which in the present embodiment is realized in slide gate technology, and its three die parts 54, 56, 58 for the second bearing element 16 is illustrated in FIG. 7, whereas FIG. 6 illustrates the second bearing element 16. The second bearing element 16 is supported on the end face of the first bearing element 14 by a support surface 60. The second bearing element 16 is locked with the first bearing element 14 by hook-shaped locking projections 62 that engage in recesses (undercuts) 64 in the inner side of the collar 22 of the first bearing element 14.

The second bearing element 16 has an overlapping or hold-down surface 70 on a circumferential overlapping projection 68, located at an axial distance 66 above the support surface 60. The designs and thus the (relative) positions of the bearing surface 26 (of the first bearing element 14) on the one hand and the support surface 60, the hold-down surface 70 and their distance 66 (at the second bearing element 16) on the other hand, are all caused by die-dependent mold separations A (see FIGS. 6 and 7), since, as illustrated in FIG. 7, the (main) die separation plane 72 between the (upper) die part 54 and the two (lower slide gate) die parts 56, 58 lie outside the above described region of the second bearing element 16. Thus, the receiving (annular) gap 74 of the bearing unit 12 for receiving the inner flange 38 is defined exclusively by die-dependent mold separations, which allows for a comparatively highly precise construction, while providing for a low-cost mass production. Only the contact surface 36 at the inner flange 38 of the rotary operating element 18 is formed as a surface of a die-independent mold separation ($B_2$ in FIG. 3).

FIG. 9 further illustrates that a spacer element or a spreader element is inserted in the second bearing element 16, which can prevent an inadvertent disengagement of the locking of the two bearing elements 14, 16. FIG. 9 also illustrates that a cover cap 78 or the like may be set on the (not rotatable) second bearing element 16 of the (also stationary) bearing unit 12, which cap is surrounded be the rotary ring 42. The cover cap 48 may be backlit and/or comprise a touch control surface, one or a plurality of keys or other operating elements or a display surface and/or symbols.

LIST OF REFERENCE NUMERALS 10 rotary control structure
12 bearing unit
14 first bearing element of the bearing unit
16 second bearing element of the bearing unit
17 mold separations
18 rotary operating element of the rotary control structure
20 rotation axis of the rotary operating element of the rotary control structure
22 collar of the first bearing element
24 front face of the collar of the first bearing element
26 bearing surface on the front face of the collar of the first bearing element
28 injection molding die
30 die part of the injection molding die for the first bearing element
32 die part of the injection molding die for the first bearing element
34 die separation plane of the injection molding die for the first bearing element
36 contact surface of the rotary operating element
38 inner flange at the rotary operating element
40 sleeve of the rotary operating element
42 rotary ring of the rotary operating element
44 retaining element for the rotary ring of the rotary operating element
46 die separation plane of the injection molding die for the rotary operating element
48 injection molding die for the rotary operating element
49 die part of the injection molding die for the rotary operating element
50 die part of the injection molding die for the rotary operating element
52 injection molding die for the second bearing element
54 die part of the injection molding die for the second bearing element
56 (slide gate) die part of the injection molding die for the second bearing element
58 (slide gate) die parts of the injection molding die for the second bearing element
60 support surface
62 locking projections
64 recesses
66 distance between support surface and hold-down surface
68 overlapping projection at the second bearing element of the bearing unit
70 hold-down surface at the overlapping projection at the second bearing element
72 die separation plane of the injection molding die for the second bearing element
74 receiving (annular) gap of the bearing unit
76 spacer (spreader) element
78 cover cap
$A_{1, 2, 3}$ die-dependent surfaces at the injection molding sites
$B_{1, 2, 3}$ die-independent surfaces at the injection molding sites

The invention claimed is:

1. A method for the production of an operating device, in particular for a vehicle component, comprising a rotary operating element and a bearing unit at which the rotary operating element is supported for rotation about a rotation axis, the method comprising:

producing the rotary operating element rotatable about the rotation axis as an injection-molded plastic part in a first molding die having a die separation plane, wherein the rotary operating element includes a contact surface that extends in a radial plane relative to the rotation axis and concentrically to the same, wherein the rotary operating element has a flange on which the contact surface is formed;

producing a first bearing element of the bearing unit as an injection molded plastic part in a second molding die having a die separation plane, the first bearing element having a bearing surface that extends in a radial plane relative to the rotation axis and concentrically to the same;

forming either the bearing surface of the first bearing element or the contact surface of the rotary operating element outside the die separation plane of the injection molding die ford the relevant element;

forming the other of the two surfaces in the die separation plane of the injection molding die for the relevant element;

assembling the rotary operating element and the bearing unit to each other such that the contact surface of the rotary operating element contacts the bearing surface of the first bearing element of the bearing unit; and forming a second bearing element of the bearing unit as an injection-molded plastic part produced in a third molding die with a die separation plane, the second bearing element being mechanically coupled with the first bearing element, the bearing unit having a support surface for support at the bearing surface of the first bearing element and a hold-down surface to extend above the flange of the rotary operating element, wherein the support surface and the hold-down surface are each substantially concentric with respect to the rotation axis and, seen along the rotation axis, spaced apart from each other, wherein the support surface and the hold-down surface are respectively arranged outside the die separation plane of the third molding die.

2. The method of claim 1, further comprising forming the first bearing element to have an inner, upward projecting collar inserted into the rotary operating element and a front face that forms the first bearing surface when the flange of the rotary operating element rests on the front face with its contact surface and is radially spaced from the front face, and when the second bearing element is locked with the first bearing element, wherein locking projections of one bearing element, which lockingly cooperate with the other bearing element, are secured against inadvertent disengagement.

3. The method of claim 1 further comprising:
forming the flange of the rotary operating element to protrudes inward from radially outside;
inserting the second bearing element into the first bearing element, the second bearing element being offset radially inward with respect to the first bearing element; and
inserting a spacer element into the second bearing element to prevent an inadvertent disengagement of the locking projections.

4. An operating device, in particular for a vehicle component, comprising:

a rotary operating element which is rotatable about a rotation axis, the element being formed as an injection-molded plastic part produced in a molding die having a die separation plane, and a bearing unit at which the rotary operating element is supported for rotation about the rotation axis, wherein the bearing unit comprises a first bearing element formed as an injection-molded plastic part produced in a molding die having a die separation plane, wherein the first bearing element has a bearing surface extending in a radial plane with respect to the rotation axis and concentrically to the same, and wherein the rotary operating element has a contact surface contacting the bearing surface, the contact surface also extending in a radial plane with respect to the rotation axis and concentrically to the same, wherein either the bearing surface of the first bearing element or the contact surface of the rotary operating element is arranged outside of a surface region formed on the bearing surface or the contact surface that corresponds to the die separation plane of the injection molding die of the respective element, and wherein the other of the two surfaces is arranged in the surface region formed on the other of the two surfaces that corresponds to die separation plane of the injection molding die for the respective element, wherein the rotary operating element has a flange on which the contact surface is formed, wherein the bearing unit comprises a second bearing element adapted to be mechanically coupled with the first bearing element, which has a support surface for support at the bearing surface of the first bearing element and a hold-down surface to extend above the flange of the rotary operating element, wherein the support surface and the hold-down surface are each substantially concentric with respect to the rotation axis and, seen along the rotation axis, spaced apart from each other, wherein the second bearing element is formed as an injection-molded plastic part produced in a molding die with a die separation plane, wherein a surface region formed on the second bearing element corresponds to the die separation plane of this injection molding die and is arranged outside the support surface and the hold-down surface.

5. The operating device of claim 4, wherein the first bearing element has an inner, upward projecting collar inserted into the rotary operating element and having a front face that forms the first bearing surface, that the flange of the rotary operating element rests on the front face with its contact surface and is radially spaced from the front face, and that the second bearing element is locked with the first bearing element, wherein locking projections of one bearing element, which lockingly cooperate with the other bearing element, are secured against inadvertent disengagement.

6. The operating device of claim 4, wherein the flange of the rotary operating element protrudes inward from radially outside, and that the second bearing element is inserted into the first bearing element and is offset radially inward with respect to the first bearing element, wherein a spacer element is inserted into the second bearing element to prevent an inadvertent disengagement of the locking projections.

* * * * *